United States Patent [19]

van der Burgt

[11] Patent Number: 4,619,400

[45] Date of Patent: Oct. 28, 1986

[54] SELF CLEANING VARIABLE WIDTH ANNULAR SLIT ATOMIZER

[75] Inventor: Maarten J. van der Burgt, The Hague, Netherlands

[73] Assignee: Shell Oil Company, Houston, Tex.

[21] Appl. No.: 620,309

[22] Filed: Jun. 13, 1984

[30] Foreign Application Priority Data

Jun. 13, 1983 [GB] United Kingdom ............... 8316051

[51] Int. Cl.[4] ............................. B05B 3/02; B05B 3/14
[52] U.S. Cl. ................................. 239/102.1; 239/116; 239/214.25; 239/456
[58] Field of Search ............... 239/106, 114, 115, 116, 239/182, 214, 214.25, 380, 424, 451, 102, 214.11, 214.15, 214.19, 456

[56] References Cited

U.S. PATENT DOCUMENTS 1,320,374  11/1919  Brown ........................... 239/456 X
3,077,857   2/1963  Widner .......................... 239/456 X
3,317,139   5/1967  Freeland ........................ 239/102
4,389,999   6/1983  Jaqua .......................... 239/102 X

FOREIGN PATENT DOCUMENTS 3101112  9/1982  Fed. Rep. of Germany ...... 239/214
 638638  6/1950  United Kingdom ........... 239/214.11
1470820  4/1977  United Kingdom .

Primary Examiner—Andres Kashnikow

[57] ABSTRACT

A self-cleaning variable width annular slip atomizer is provided. The atomizer has a tubular body, a valve stem coaxially located in the tubular body and valve member that forms an annular slit type nozzle of a variable width with the tubular body. The valve member is continuously rotatable during operation for cleaning the slit nozzle. The valve stem may have a central opening therethrough for introducing gaseous matter into materials atomized.

8 Claims, 1 Drawing Figure

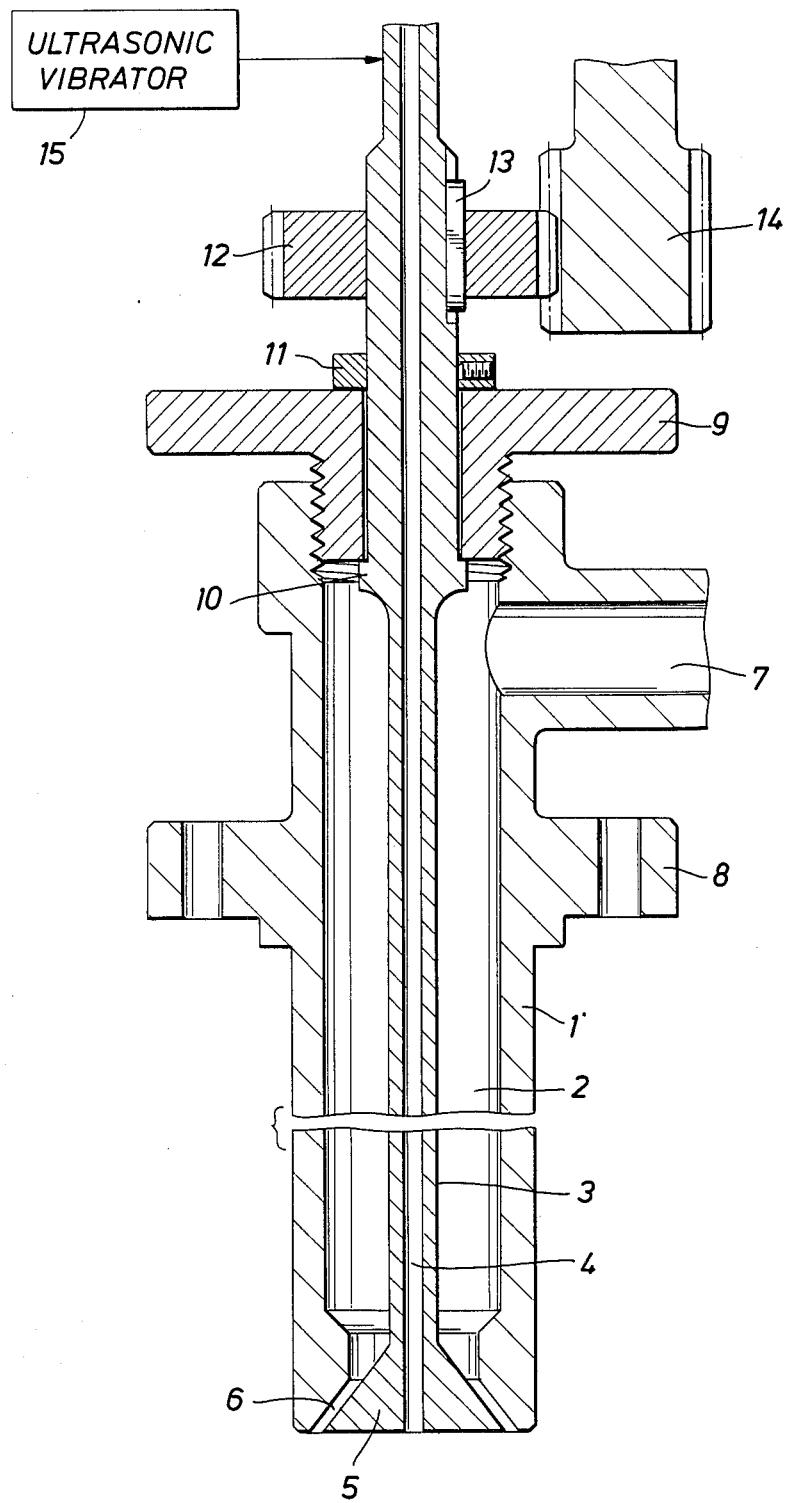

SELF CLEANING VARIABLE WIDTH ANNULAR SLIT ATOMIZER

BACKGROUND OF THE INVENTION

The present invention relates to an atomizer for liquids or slurries, said atomizer having an annular slit nozzle and to a process in which such an atomizer is used for the partial or complete combustion of a hydrocarbon fuel.

The construction of an atomizer for the partial or complete combustion of large quantities of hydrocarbon fuels presents a number of design problems which arise on account of the specific nature of the combustion reaction and of the large quantities of hydrocarbon fuels which it is required to handle. Such an atomizer should be designed so as to provide the degree of atomization of the fuel required to ensure intimate mixing of fuel and oxygen thus obtaining a high yield of product gas and a low soot production. The design should also be such that the pressure differential across the atomizer required to obtain the required degree of fuel atomization is not prohibitively high.

In British patent specification 1470820 there is described an atomizer for an efficient atomization of fuel achievable at a low pressure differential across the atomizer. This known atomizer is provided with an annular slit nozzle wherein the width of the slit may be varied within a wide range during operation of the atomizer. This arrangement of the atomizer allows a readily adjustment or regulation of the slit to properly handle the fuel at different pressures and to discharge the fuel in the desired manner and in the desired quantities.

By varying the slit width it can be ensured that the fuel is ejected from the slit substantially in the extension of the slit and not at an angle to the said extension, resulting in a constant stream of atomized fuel globules issuing from the outlet slit. Further, the pressure differential across the slit can be kept rather moderate at high fuel throughput by varying the slit width. A very high pressure differential across the slit would necessitate the using of very high pressure fuel feed equipment which would make the atomizer economically unattractive.

In addition to the possibility of adjusting the slit size this known atomizer can also vary the pressure differential across the slit within a certain range and still obtain good atomization. By appropriate control of these two variables it is therefore possible to operate the atomizer over a wide range of fuel throughputs.

SUMMARY OF THE INVENTION

An object of the present invention is to further improve the variable slit atomizer as known from British patent specification No. 1470820.

The width of the annular slit in the atomizer of prior invention is rather small and lies preferably between 0,1 and 1 millimeter. If fuels containing solid contaminations or fuels formed by slurries of solid fuel particles are to be atomized, it may happen that solids obstruct the slit especially when the atomizer is operated at a rather small slit width. Such slit obstructions may cause a non-uniform outflow of the fuel and therefore impairment of the pattern of the atomized fuel and the atomization itself. If residual fuels are to be atomized deposits in the slit opening may also be caused due to coke formation on the slit walls. Such a coke formation occurs if fuel droplets accidentally adhere to the slit walls and are exposed to the high temperature near the atomizer outlet resulting in a partial vaporization of the fuel droplets and the formation of a solid residue on the slit wall. The above deposits may result in a less efficient operation and may ultimately force stopping the process for cleaning the atomizer's slit.

The present invention now provides a variable slit atomizer which can be continuously operated without the necessity of interrupting the atomization process for cleaning the slit nozzle.

The atomizer according to the invention thereto comprises a tubular body having an open end and a connection for the supply of fluid under pressure. A valve stem extends through the tubular body and has a valve member attached to one end, said valve member forming with the tubular body a substantially annular slit nozzle with a variable width. The valve member is rotatably arranged in the tubular body to allow continuous rotation thereof for cleaning the slit nozzle without influencing the width of the annular slit nozzle.

The atomizer according to the present invention may be suitably used for the atomization of any liquid or slurry of solids in liquid. Hence, it may suitably be used for the atomization of water and this finds very advantageous application for the injection of water into flare systems in order to reduce the luminosity and noise of the flare. It may even more preferably be used for combustion systems for residual liquid fuels having a tendency to coke formation and for slurries of solid fuels in a liquid, such as coal particles in oil. The proposed atomizer is particularly suitably employed in burners for the partial or complete combustion of last-mentioned substances.

An important feature of the present atomizer is that the valve member is rotatably mounted in the tubular body, so that the valve member can be continuously rotated without influencing the width of the slit nozzle. As already mentioned in the above it may happen that solids adhere to the walls of the slit nozzle, especially if heavy residual fuels or slurries are atomized.

Especially when the width of the slit nozzle is rather small, required for a proper atomization of the fuel at relatively low throughputs, the solids adhered to the walls of the slit nozzle may easily form obstructions hampering the passage of fluid through part of the slit nozzle. The area available for the throughflow of fluid diminishes, resulting in a pressure build up over the nozzle and an irregular outflow of fluid not uniformly distributed over the total area of the slit nozzle. Both aspects will contribute to impairment of the quality of atomization attainable with said atomizer.

It may further occur that solid particles in the fluid flow are too large for passing through the slit nozzle. This risk increases if the slit nozzle opening is chosen to be small. In this way the entry of the slit nozzle is locally blocked, with the effect that the atomizing pattern of the liquid is disturbed due to a non-uniform distribution of the liquid over the slit nozzle and that the pressure drop over the slit nozzle increases.

Continuously rotating the valve member during operation of the proposed atomizer has the following positive effects on the atomization process. Solids deposited on the walls of the slit nozzle and thereby bridging the space between the opposite slit walls are removed therefrom by the scraping action generated by displacing the opposite walls of the slit nozzle relative to one another. These solids are in fact cut away and subsequently discharged from the slit nozzle by the outgoing liquid flow. Solid particles which are too large for passing through the slit nozzle tend to block the entry of this nozzle. By rotating the valve member while the tubular member remains stationary, these oversized solids can be broken up into smaller fragments which can easily be transported by the fluid flow through the slit nozzle. The grinding action is obtained by the opposed edges at the entry sliding along each other during rotation of the valve member. The last-mentioned effect of rotation of the valve member will be more pronounced if the edges at the entry of the slit nozzle are relatively sharp.

It should however be borne in mind that in order to have a smooth fuel flow through the slit and to maintain the pressure differential across the atomizer for a given fuel throughput at an acceptable level, a smooth entrance of the slit should preferably be maintained.

BRIEF DESCRIPTION OF THE DRAWING

The invention will be more easily understood from the following description when taken in conjunction with the attached drawing showing a longitudinal section of an atomizer constructed in accordance with the invention.

DESCRIPTION OF THE PREFERRED EMBODIMENT

In a preferred embodiment of the invention the valve stem is rotatably mounted for rotating the valve member.

If the atomizer is intended for the atomization of highly viscous fuels with a considerable risk of coke formation it is advantageous to combine the above-mentioned rotatability of the valve member with further measures for reducing the possibility of obstruction formation in the fuel passages. According to the invention these measures are preferably formed by applying a vibration source causing a vibration of the atomizer, i.e., the tubular body and/or the valve member, during operation of the atomizer. The vibrating means are preferably operated at an ultrasonic frequency, so that the cross sectional area in the atomizer available for the fuel transport is substantially not influenced by the vibrations imposed on the atomizer. The direction of the imposed vibrations hardly influences the effect obtained, and may therefore be freely chosen in a direction either radial or longitudinal with the main axis of the atomizer.

If the atomizer is used for combustion of fuels, the atomizer is normally arranged in an opening of a refractory lined wall enclosing the combustion space. In this case the vibrating means should preferably be coupled to the valve stem instead of to the tubular body in order to prevent damage to the refractory lining due to the generated vibrations.

Preferably, the valve member has a conical configuration and forms with the tubular body a cirular outwardly diverging annular slit nozzle.

In a preferred embodiment of the invention the valve member is provided with an internal channel for the passage of a gaseous medium. The channel being provided with an open end, is suitably positioned at the center of the valve member, as diagrammatically depicted in the drawing. The object of the gas passage is two-fold. First, the gas issuing from the passage provides an effective thermal shield for the end face of the valve member against the intense heat produced by the combustion, partial or total, of the fuel ejected from the annular slit nozzle. The end face of the valve member is therefore kept cooler than it would otherwise be and does therefore not burn away to any great extent. Second, the gas issuing from the valve member fills the gap in the annular fuel flow from the slit nozzle. In the absence of the gas, the high velocity fuel flow might cause suction of hot reactor gases along the front of the atomizer. The heat flux of these hot reactor gases might easily form a severe risk of overheating of the atomizer.

The type of gas used for cooling the atomizer may be freely chosen, provided that it does not adversely affect the combustion of the fuel. If the reaction temperature should be lowered the gas preferably has a temperature moderating effect. Such a gas is for example steam or cooled reactor gas. In a preferred embodiment of the invention in which the atomizer is used for fuel combustion, the channel in the valve member is used for the passage of oxygen. Apart from cooling the end face of the valve member, the oxygen further forms a contribution for the combustion of the fuel. If used in combustion processes, the atomizer is surrounded by a channel for supplying a combustion medium, such as air or pure oxygen to the fuel spray issuing from the slit nozzle. When however the annular fuel flow has a rather large width it is advantageous to contact the fuel flow not only from the outer side but also from the inner side thereof with oxygen. In this manner an intimate mixing and therefore proper reaction of the fuel with combustion medium can be attained.

The passage in the valve member may optionally be connected to a fuel supply source in stationary operation of the atomizer. In the latter case a minimum fuel supply is provided to the atomizer in those instances where the fuel to the main outlet, i.e., the annular slit nozzle is shut off. The auxiliary fuel supply keeps the reactor hot during temporary shut downs or during periods when the reactor is operated on zero load.

The invention also relates to a process in which the atomizer described above is used for the partial or complete combustion of a hydrocarbon fuel, in particular a heavy liquid fuel or a slurry of liquid fuel and solid fuel particles. The application of the atomizer for this purpose is advantageous over application of conventional atomizers for a number of reasons of which the major one is that it allows continuous operation without the risk of malfunctioning due to blockage of the slit nozzle caused by solid deposits. In order to optimize the combustion of the fuel when using the atomizer according to the invention the valve member is continuously rotated so that the walls defining the slit nozzle are continuously displaced relative to one another. This movement of said nozzle walls ensures a continuous grinding action on the particles formed or deposited in or at the entry of the slit nozzle. Operation at low throughputs requires a relatively small slit opening for a proper atomization of the fuel. Such a small slit opening might easily cause disturbance of the fuel flow pattern and therefore inefficiency of the atomization. Continuous rotation of the valve member guarantees a fully unhampered flow of the fuel through the slit nozzle.

If very heavy liquids or slurries with a considerable amount of solid particles therein are to be processed, it is advantageous to take further steps for reducing the risk of obstructions either in the fuel supply line of the atomizer or in the slit nozzle itself. The application of vibrating means for imposing vibration, in particular with an ultrasonic frequency as preferred according to the present invention, to the atomizer is suitably used as such a further measure reducing the occurrence of flow obstructions.

In a preferred process according to the invention oxygen is caused to flow through the valve member for cooling the latter and for supplying combustion medium to the atomized fuel. Owing to this fluid flow liquid droplets adhered to the relatively cold valve member will evaporate less rapidly and to a less extent thereby giving less chance to coke formation than in the situation where the valve member is not cooled.

The drawing shows an atomizer having an elongated tubular body 1, the bore of which is indicated by reference numeral 2, and a hollow valve stem 3 with a bore 4, which valve stem is substantially coaxially arranged in the bore 2. One end of the valve stem 3 is provided with a valve member 5 such that the latter forms with the inner surface of the outer part of tubular body 1 a substantially annular slit nozzle 6. The valve member 5 may form an integral part of the valve stem 3, as shown in the drawing. It is also possible to apply a separate valve member, which is, for example, detachably connected to the valve stem 3.

The tubular body 1 may be in the form of an integral member or casting and is cylindrical in its general configuration like the valve stem 3. A lateral fluid inlet port 7 for the supply of fluid under pressure communicates with the bore 2 near the upper end of the tubular body 1. The tubular body 1 is at its periphery provided with a connection flange 8 enabling installation of the atomizer in for example a burner for combustion of heavy liquid fuels or fuels in the form of slurries. The valve member 5 is adjustable in axial direction to control the discharge of fluid from the slit nozzle 6, via a control head 9 screw threaded in the upper end of the tubular body 1. Thereto the valve member 5 is provided with retaining rings 10 and 11 at both sides of the control head 9. The upper guiding ring 11 is preferably detachably connected to the valve member 5 for enabling an easy removal thereof from the bore 2. Not shown sealing means are provided between the control head 9 and the valve stem 3 in order to prevent fluid leakage from the bore 2.

The control head 9 may be manually operated. It is also possible to apply an automated system for controlling the position of the control head 9 and therefore the width of the slit nozzle 6. In the latter case the control head 9 may for example be electrically coupled to the fluid supply so that the width of the slit nozzle 6 is automatically adjusted upon variations in the fluid supply. It should be noted that the bore in the control head 9, through which the valve stem 3 passes, is chosen sufficiently wide to allow free rotation of the valve stem 3 in the control head 9.

For rotating the valve member 5, the valve stem 3 is at its upper part provided with a gear wheel 12 firmly connected to said stem 3 by means of a key 13. The gear wheel 12 is driven by a pinion 14. The whole arrangement of the gear wheel 12 and control head 9 is such that the valve stem 3 and thus the valve member 5 may be rotated without longitudinal displacement of those elements and thus without influencing the width of the slit nozzle 6.

Finally, the bore of the valve stem is connected to an oxygen source (not shown) for the supply of a gaseous medium, such as oxygen to the valve member.

The operation of the atomizer for combustion of a fuel is as follows. A fuel, such as a heavy residual oil enters into the bore 2 via the fuel inlet port 7 and leaves the tubular body 1 via the annular slit nozzle 6. The width of the slit is varied during operation by adjustment of the control head 9 which enables the valve stem 3 to move up and down inside the bore 2 of the tubular body 1. The sealing between the valve stem 3 and the control head 9 ensures that no fuel can escape via the upper end of the tubular body 1. During operation obstruction of the passage available for the fuel in the slit nozzle 6 due to solid particles in the fuel flow or coke formation is prevented by continuously rotating the valve member 5 by driving the gear wheel 12 via the pinion 14. An essential feature of the operation of the proposed atomizer consists herein that rotation of the slit nozzle 6 does not influence the width of the latter.

During operation oxygen is passed through the bore 4 of the valve stem 3 and the valve member 5 for cooling the latter. The supplied oxygen further serves as an auxilliary source for completing the combustion or gasification of the fuel issuing from the slit nozzle 6. The shown atomizer may be further provided with vibrating means 15 serving to further reduce the risk of flow passage obstructions as mentioned in the above.

What is claimed is:

1. A self cleaning atomizer for liquids comprising:
   a tubular body, said body having an open end and an inlet for supplying liquids under pressure to the interior of the body, said open end having a conical surface;
   a valve stem extending through the tubular body, said valve stem being rotatably mounted coaxially within said tubular body;
   a valve member having a conical shape, said valve member being secured to one end of said valve stem adjacent the open end of said tubular body and forming with the open end of the tubular body a substantially diverging annular slit nozzle of preselectable width;
   means coupled to said valve stem to allow continuous rotation of the valve stem and valve member without changing a preselected width of the annular slit nozzle; and
   means for vibrating the atomizer.

2. Atomizer as claimed in claim 1, wherein the means for vibrating are operable at an ultrasonic frequency.

3. Atomizer as claimed in claim 2, wherein the vibrating means are coupled to the valve stem.

4. Atomizer as claimed in claim 1, wherein the means for vibrating are coupled to the valve stem.

5. Atomizer as claimed in claim 1, wherein the valve member is provided with an internal channel for the passage of a gaseous medium.

6. Atomizer as claimed in claim 5, wherein the means for vibrating are coupled to the valve stem.

7. Atomizer as claimed in claim 5, wherein the means for vibrating are operable at an ultrasonic frequency.

8. Atomizer as claimed in claim 7, wherein the vibrating means are coupled to the valve stem.

* * * * *